US007864795B2

(12) United States Patent
Barbaresi et al.

(10) Patent No.: US 7,864,795 B2
(45) Date of Patent: Jan. 4, 2011

(54) METHOD AND SYSTEM FOR SERVICE ALLOCATION IN COMMUNICATION NETWORKS, RELATED NETWORK AND COMPUTER PROGRAM PRODUCT THEREFOR

(75) Inventors: Andrea Barbaresi, Turin (IT); Andrea Merlo, Salerano (IT); Javier Leonardo Quijano Araque, Turin (IT)

(73) Assignee: Telecom Italia S.p.A., Milan (IT)

( * ) Notice: Subject to any disclaimer, the term of this patent is extended or adjusted under 35 U.S.C. 154(b) by 335 days.

(21) Appl. No.: 11/578,786

(22) PCT Filed: Apr. 19, 2004

(86) PCT No.: PCT/IT2004/000221

§ 371 (c)(1),
(2), (4) Date: Oct. 18, 2006

(87) PCT Pub. No.: WO2005/101889

PCT Pub. Date: Oct. 27, 2005

(65) Prior Publication Data

US 2007/0232282 A1  Oct. 4, 2007

(51) Int. Cl.
*H04L 12/43* (2006.01)
(52) U.S. Cl. .................. 370/459; 370/252; 370/442; 370/443; 370/444; 370/458; 455/450; 379/112.03
(58) Field of Classification Search ............... 455/450; 370/442, 443, 444, 458, 252, 459; 379/112.03
See application file for complete search history.

(56) References Cited

U.S. PATENT DOCUMENTS

| | | | |
|---|---|---|---|
| 6,282,424 B1 * | 8/2001 | Wright et al. | 455/450 |
| 6,484,145 B1 * | 11/2002 | Horne et al. | 705/8 |
| 2004/0097267 A1 * | 5/2004 | Pecen et al. | 455/560 |

FOREIGN PATENT DOCUMENTS

EP   0 889 663 A1   1/1999

(Continued)

OTHER PUBLICATIONS

Wilhelm, M., "Radio Communication System and Constituent Elements for Method of Radio Transmission by Various Radio Transmission Modes," Patent Abstracts of Japan, JP Publication No. 2001352576 A, 1 Sheet, (Dec. 21, 2001).

(Continued)

*Primary Examiner*—Jason E Mattis
*Assistant Examiner*—Omer Mian
(74) *Attorney, Agent, or Firm*—Finnegan, Henderson, Farabow, Garrett & Dunner, L.L.P.

(57) ABSTRACT

A system for controlling, in a multi-resource communication network, the delivery of services by at least one resource capable of simultaneously delivering, within a maximum joint service capacity, at least one first type of service to a first set of users and a second type of service to a second set of users. The increase in the first set of users is capable of causing a decrease in the capacity to serve new users of the second set of users. At least one module for estimating a parameter representing the probability that, in a given time interval, the number of service requests of said second type is such as not to cause the maximum service capacity to be reached. In the presence of a service request of the first type, the estimation module compares the parameter with a respective threshold value and indicates the acceptability of the service request of the first type if that parameter exceeds the respective threshold. If the parameter is lower than the threshold value, then the estimation module evaluates the possible decrease in the capacity to serve new users of the second set of users which can be induced by the acceptance of the request of the first type of service and then compares the possible decrease with a respective decrease threshold value. The service request of the first type is then accepted or blocked.

16 Claims, 6 Drawing Sheets

FOREIGN PATENT DOCUMENTS

| WO | WO 00/70901 | 11/2000 |
| --- | --- | --- |
| WO | WO 02/32160 A2 | 4/2002 |
| WO | WO 02/32179 A1 | 4/2002 |
| WO | WO 02/054677 A1 | 7/2002 |
| WO | WO 03/069938 A1 | 8/2003 |

OTHER PUBLICATIONS

3GPP TR25.881, "3$^{rd}$ Generation Partnership Project; Technical Specification Group Radio Access Network; Improvement of RRM Across RNS and RNS/BSS," Release 5, Proposed Technical Report, pp. 1-44, (2002).

3GPP TR 25.891, "3$^{rd}$ Generation Partnership Project; Technical Specification Group Radio Access Network; Improvement of RRM across RNS and RNS/BSS (Post Rel-5)," Release 6, Technical Report, 17 sheets, (2002).

3GPP TR 23.934, "3$^{rd}$ Generation Partnership Project; Technical Specification Group Services and System Aspects; 3GPP System to Wireless Local Area Network (WLAN) Interworking; Functional and Architectural Definition," Release 6, Technical Report, pp. 1-37, (2001).

Furuskär, A., "Radio Resource Sharing and Bearer Service Allocation for Multi-Bearer Service, Multi-Access Wireless Networks," Kungl Tekniska Högskolan, Royal Institute of Technology, pp. i-ix and 93-101, (May 2003).

ETSI TR 101 957, "Broadband Radio Access Networks (BRAN); HIPERLAN Type 2; Requirements and Architectures for Interworking Between HIPERLAN/2 and 3$^{rd}$ Generation Cellular Systems," Technical Report, pp. 1-56, (2001).

\* cited by examiner

METHOD AND SYSTEM FOR SERVICE ALLOCATION IN COMMUNICATION NETWORKS, RELATED NETWORK AND COMPUTER PROGRAM PRODUCT THEREFOR

CROSS REFERENCE TO RELATED APPLICATION

This application is a national phase application based on PCT/IT2004/000221, filed Apr. 19, 2004, the content of which is incorporated herein by reference.

FIELD OF THE INVENTION

The present invention relates to techniques for allocating services on communication networks.

The invention was developed with particular attention to its possible use in mobile radio networks, in particular to manage available radio resources. A preferred, but not exclusive, field of application of the invention is the Common Radio Resource Management of a "heterogeneous" cellular mobile radio network, i.e. one that comprises different systems.

BACKGROUND ART

In the field of cellular mobile radio systems, different technologies and numerous standards exist. The currently most widely used systems, i.e. second-generation systems, such as GSM (Global System for Mobile communications), are currently being complemented, and will increasingly become so in the future, by new types of mobile radio systems such as third-generation systems, like UMTS (Universal Mobile Telecommunication Network), or fourth-generation systems that are still being defined, or by new broadband Wireless LAN (Local Area Network) systems.

Current second-generation cellular networks are mostly designed to offer voice service, whilst third and fourth generation are conceived to offer a new series of data and multimedia services as well. It is foreseeable that new cellular networks will not completely replace the second generation networks currently existing and commonly used, but rather will complement them.

Thus, the networks resulting from the integration of available technologies will be able to provide clients with the ability to use new services, in addition to the usual voice service. The integration is made possible by the characteristics of the new standards, defined in such a way as to allow the new systems to be used jointly and in synergetic fashion with current cellular networks. Within the 3GPP (3rd Generation Partnership Project) standard, which defines the characteristics of the UMTS system, are specified, for instance, different procedures that enable the UMTS network to interwork with the GSM network.

In particular, the standards 3GPP TR25.881 "Improvement of RRM across RNS and RNS/BSS, Release 5", and 3GPP TR25.891 "Improvement of RRM across RNS and RNS/BSS, Release 6", define the functional models and the network architectures within which the CRRM algorithms are applied.

A clear market trend is the use of Wireless LAN (WLAN) technologies within a limited region of territory (called "hot-spot") to offer broadband access to users characterised by limited mobility.

In general, Wireless LAN systems are limited to providing access to telecommunication services in a circumscribed region of territory. Consequently, they do not have a complex architecture like the one that characterises mobile radio networks (GSM or UMTS).

Wireless LAN technologies can be used within a mobile radio network in the access segment. For this reason, in the specifications of the different systems, both mobile radio and Wireless LAN, a series of activities is currently being carried out, with the aim of defining the most suitable interworking mechanisms IEEE 802.11 or HIPERLAN2) for access to the third generation mobile radio transport network.

The document of the standard 3GPP TR 23.934 "3GPP system to Wireless Local Area Network (WLAN) Interworking—Functional and architectural definition", Release 6, specifies, for example, the functional requirements that must be met by the different network architectures that include the Wireless LAN accesses of the IEEE 802.11 in the UMTS network. Similarly, the document of the standard ETSI (European Telecommunication Standards Institute) TR 101.957 "Broadband Radio Access Networks (BRAN); HIPERLAN Type 2; Requirements and Architectures for Interworking between HIPERLAN/2 and $3^{rd}$ Generation Cellular systems" specifies the interworking mechanisms of the broadband Wireless LAN standard, called HIPERLAN2, with the UMTS network.

Multi-mode mobile terminals (such as cellular telephones, personal digital assistants (PDA), connectivity cards for personal computers, etc.), designed to be able to use the different available technologies are already present in the market, and will be available in ever greater numbers in the years to come. These mobile terminals therefore are not constrained to work with a single network (i.e., following a single standard), but can indifferently use different systems, based on different standards. An example in this sense is provided by the "multi-mode" devices that are already able indifferently to handle the GSM, UMTS and Wireless LAN 802.11b standards.

Through appropriate mechanisms, it is also possible to enable a service already ongoing on a system to be transferred on another system. A method to manage the procedure for transferring a service already ongoing from one system to another is described, for example, in the document WO-A-3/069938.

At the time a request is made for a certain type of service capable, for its characteristics, of being delivered through different access systems (GSM, UMTS or Wireless LAN), it is possible to select the system to use according to considerations of opportunity and global efficiency of the multi-access network.

Within a context like the one described above, an operator of a network who uses the GSM and UMTS technologies and the Wireless LAN hot-spots is faced with the problem to be able to use, in integrated and synergetic fashion, all the resources offered by these systems to maximize the overall efficiency and the exploitation of the telecommunications network.

This context of application therefore presupposes the existence of criteria for common radio resource management (CRRM) to determine, case by case and according to the type of service requested by the user, which policy to follow to select the system that is best suited to offer the service and which criterion to apply to achieve the established efficiency targets.

The different standards mentioned above specify only the architectures, procedures and mechanisms for the interworking of the different systems, including the initial selection of which system to use when a service is requested.

However, the standards leave open the choice of the most appropriate criterion to use these tools in an effective and efficient manner.

In principle, remaining within the scope of the network architectures and interworking tools made available by the different standards, different common radio resource management methodologies, more or less valid, can be adopted.

In general, the requests that reach a network are not of a single type (e.g. only voice), but of different types (e.g. voice, streaming/interactive data characterized by different bit rates, etc.).

To take this situation into account, one can decide a priori to set a certain quantity of resources to manage exclusively a specific service. However, this "rigid" choice may not be advantageous if one wants to prevent the emergence of the situation in which new requests for a certain service can no longer be satisfied, as a result of the complete occupation of the resources dedicated to it. This is also true when, as a whole, the multi-access network would in fact still have available resources (which were devoted a priori to the exclusive use of another service).

In the more general case, therefore, it is preferable that the different services, even if they are of different types, could occupy the same set of radio resources, made globally available by the individual systems that compose the multi-access network.

For example, in the case of the GSM system, single radio "channels" (identified by the frequency and the time-slot used), can be employed both to manage a voice user, and to manage one (or more) data users (also for different types of data services).

By the same token, with the power available in a cell of the UMTS system in downlink, and with the power the mobile terminals can transmit in uplink, users requiring different services can be managed, until reaching a total limit interference level.

The different services, according to their characteristics, require a different quantity of radio resources necessary for their management.

The available resources of the multi-access network can be used for a service as well as for another. Choosing to exploit the available radio resources to manage any one of the considered services, without setting aside, a priori, a part of these resources for the exclusive use of a specific service, the resources of the multi-access network can be exploited more flexibly and efficiently, provided that suitable arrangements are adopted. In this situation, particular attention must be paid to the selection of the most suitable system to manage the service request reaching the network.

Currently, there are some known general methods which the CRRM algorithms can use to select a system over another, as suggested in Chapter 8 of the Doctoral Dissertation of Royal Institute of Technology, Stockholm (May 2003): "Radio Resource Sharing and Bearer Service Allocation for Multi-Bearer Service, Multi-Access Networks" (as of the date of filing of the present application, the dissertation in question is available at the address www.s3.kth.se/radio/Publication/Pub2003/af_phd_thesi_A.p). These methods use, for example, a predefined list of priorities, as suggested in WO-A-02/32160, to be associated to the different cases that may arise or contain a predefined selection criterion, which may vary according to the characterstics of the service under consideration. Allocation criteria are based on the characteristics of each service (such as the service class, the transfer rate to be guaranteed, the maximum requirements in terms of transfer delay and jitter) and on the loading state of the network when the new request arrives.

These methods try to assign, on each occasion, the access system that is best suited to meet the quality requirements of each type of service.

The Applicant has noted that a characteristic shared by the aforementioned methods is that they take into consideration the individual request for services that reaches the network at a given moment, neglecting the different types of service which may be requested at different instants.

Therefore, the application of these methods can lead to situations in which, to accommodate a new request for a certain service, specific network resources are used, even when not strictly necessary; this is to the detriment of subsequent requests for other types of service which, due the different intrinsic characteristics, could exclusively use the resources already allocated for the first considered service request.

In other words, taking on the management of a single request at a time, and not adopting any dynamic arrangement, prior art methods implement allocation criteria that strongly depend on the particular time sequence of the requests reaching the network.

The management of a service request at any given time, is a function of the allocations already made previously, because they determine the total loading state of the multi-access network at the time when the new request is managed. Thus, the criteria adopted by prior art methods, imply a FIBS type of logic ("First In, Best Served").

The above substantially also applies to the solutions described in the documents WO-A-02/32160, WO-A-02/32179, WO-A-02/054677, and JP-A-2001352576, solutions in which the allocation selection is made according to individual requests, taking into account only current state of the network.

DISCLOSURE OF INVENTION

From the previous description of the current situation, it is readily apparent that there is a need to define solutions capable of handling, in more satisfactory fashion, the allocation of a new service request in a multi-access mobile radio network.

The object of the present invention is to meet the aforesaid need.

According to the present invention, said object is achieved by means of a method having the characteristics set out in the appended claims. The present invention also relates to a corresponding system, a network comprising said system, and a computer product loadable into the memory of at least one computer and comprising portions of software code to implement the aforesaid method. As used herein, the reference to such a computer product is equivalent to a reference to a computer-readable means containing instructions to control a computer system in order to co-ordinate the implementation of the method according to the invention. The reference to "at least one computer" is aimed at highlighting the possibility of embodying the present invention in distributed and/or modular fashion.

In the currently preferred embodiment, the solution described herein allows to control, in a multi-resource communication network (e.g. a mixed GSM, UMTS, WLAN network), the delivery of services by at least one resource. The resource in quest ion is capable of simultaneously delivering, within a joint maximum service capacity of the resource, two or more services, and thus at least one first and one second type of service (e.g. a voice service and a data service) to a first set of users and a second set of users, respectively. However, the situation is such that the growth of the first set of users (i.e. the increase in the number of users to whom the first type of service is delivered) is capable of determining a decrease in the capacity of serving new users of said at least one second type of service (i.e. to lead to a reduction in the ability to provide other types of service to new users requesting it). The solution described herein, in the presence of a service request of the first type, provides for estimating at least one parameter, representative of the probability that, in a given time interval, the number of service requests of said at least one second type is such as not to cause the maximum service capacity to be reached. The parameter is compared with at least one respective threshold value and, if the parameter exceeds the threshold value, the first type of service request is accepted. Preferably, if the parameter is lower or equal to the threshold value, the following steps are taken:

evaluating the possible decrease in the capacity to serve new users of said at least one second type of service able to be induced by the acceptance of the request for the first type of service, comparing the possible decrease in question with a respective value of decrease threshold.

The service request of the first type is accepted only if the possible decrease is smaller than, said value of decrease threshold (for example, equal to 2 user). Otherwise, the request is blocked.

The solution described herein applies, in the currently preferred embodiment, a series of arrangements aimed at avoiding the inefficiencies resulting from the prior art logic mentioned above (FIBS), overcoming the problem of the dependency of network performance on the time sequence of arrival of the requests.

To overcome the limits described above, and to optimise the use of network resources, the solution described herein preferably uses a "region of joint capacity" associated to the multi-access network and to the combination of services to be considered. In this way, for each new service request it is possible to consider both the combination of total traffic the network has to manage, and the greater or lesser capacity of the individual systems simultaneously to support a certain number of users of each type.

In general, among all possible combinations of the number of users who utilise each service, some combinations allow a better overall exploitation of the radio resources available in the network, whilst others are less efficient.

In this sense, independently of the time sequence of the requests, the solution described herein in able to let the multi-access network operate with the combination of services that is best suited for the exploitation of all available resources, consequently reducing the likelihood that the access to a service may be blocked. A block in the access to a service occurs when the network is not able to meet a request to deliver a service because it no longer has sufficient available resources.

More in detail, the solution described herein defines a method for the selection of the best suited system to be used in the different situations that arise in a multi-access mobile radio network. The solution in question provides for determining the probability that the individual systems constituting the multi-access network may reach the limit state, in which there are no available resources left. This is done not only according to the degree of use of the individual systems when the new request for allocating a certain service arrives (instantaneous situation), but also taking into account the following factors:

possibility that occupied resources may be released (some users terminate an ongoing service);

possibility that free resources may be occupied (new users requesting a service).

Hence, by estimating the probabilities that new requests may arrive and ongoing services may be terminated, it is possible to determine the most likely evolution of the multi-access network over time.

Preferably, the allocation of new service requests on a system rather than another, is done in such a way as to minimise the likelihood that the evolution of the system over time may lead to avoid that the network no longer has available resources to meet the requests; by minimising the likelihood of reaching such limit situations, one also minimises the probability of blocking some new requests because of the lack of available resources.

In essence, within a "multi-access" mobile radio network, the solution described herein solves the problem of the selection of the most suitable system to support the request for a given set of services, adopting a criterion that is capable of selecting the best system on each occasion, based on the optimal combination of services which the system is able to manage. Therefore, system selection is not linked to the time sequence of the service requests reaching the multi-access network, but to probabilistic assessments on the type of requests which could arrive within a determined time interval.

BRIEF DESCRIPTION OF THE DRAWINGS

The invention shall now be described, purely by way of non limiting indication, with reference to the figures of the accompanying drawings, in which.

DETAILED DESCRIPTION OF EMBODIMENTS OF THE INVENTION

The solution described herein refers to the management of the radio resources used in mobile radio networks. The described solution is therefore designed to be implemented within the network apparatuses tasked with the management and control of the radio resources of the cells comprising the network during the normal operation of the system.

Figure 1:
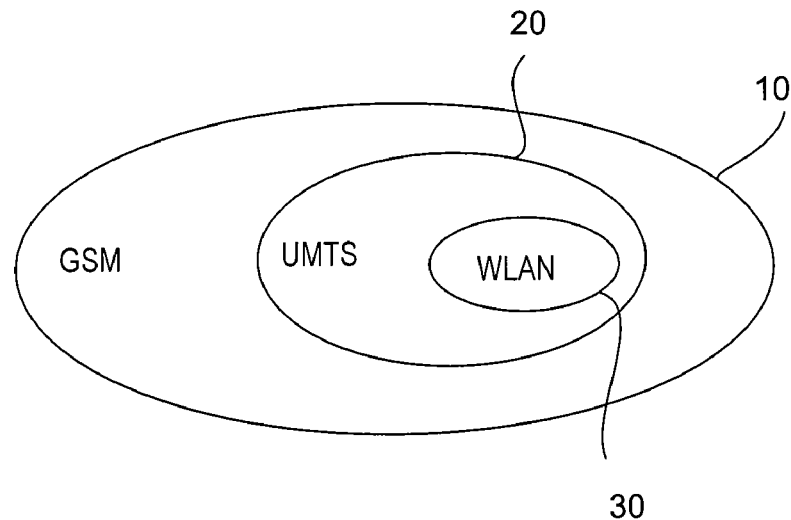
FIG. 1 shows a possible scenario of application of the solution described herein.

A possible scenario of application of the solution described herein is illustrated in FIG. 1, which shows a region of territory, designated by the reference 10, served through a mobile radio network GSM, and a sub-set of said region, designated by the reference 20, also served by the UMTS network (the area covered by the segment for accessing the UMTS segment will mostly coincide with that of the GSM system). Also considered is the presence of an additional restricted area of territory, designated by the reference 30, in which the services are offered through Wireless LAN systems.

In cases of practical interest, the WLAN area is usually located within the region also served by the cells of the UMTS system, since its use is provided in all those cases characterised by the presence of a high concentration of low mobility users requiring data services.

Figure 2:
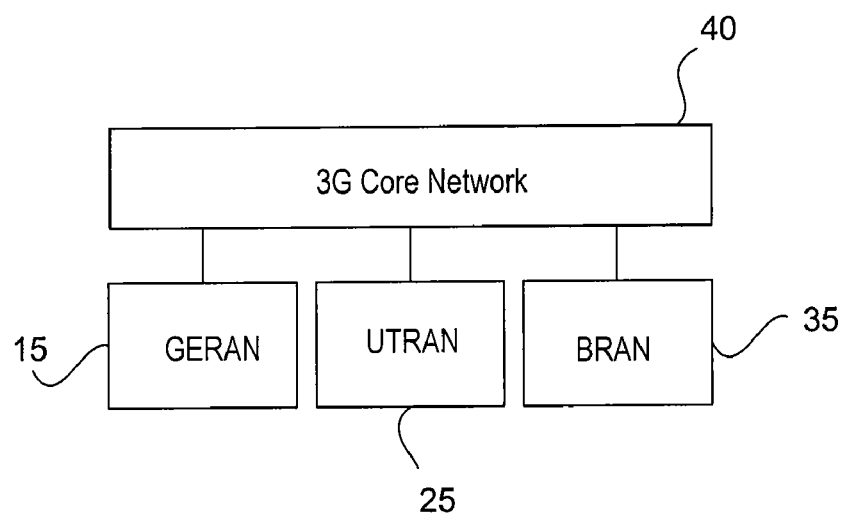
FIGS. 2 and 3 show the network architecture within which the solution described herein can find application.
Figure 3:
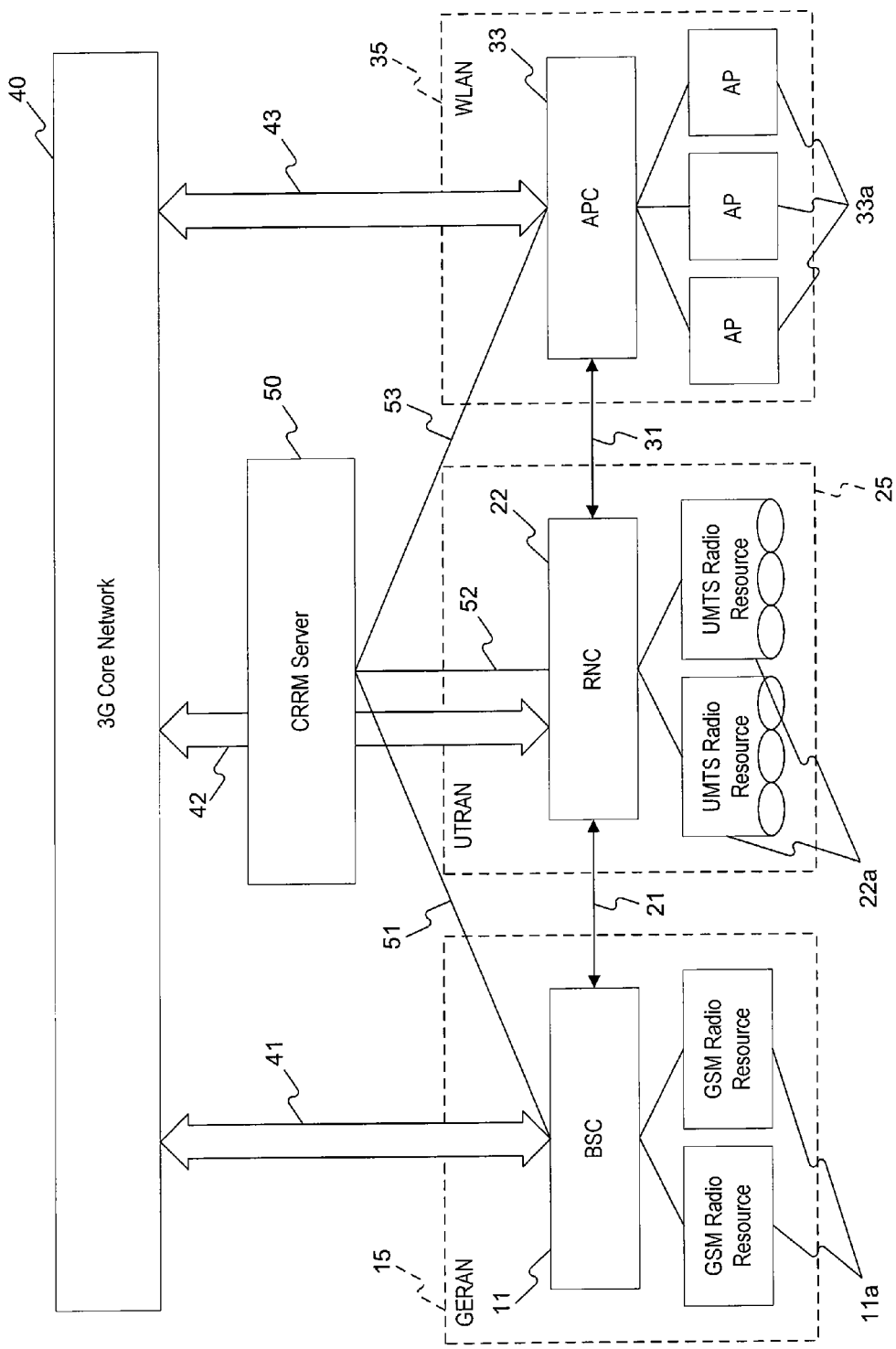

The application context described above corresponds to a network architecture of the type illustrated in FIG. 2 and, in greater detail, in FIG. 3.

The system shown in FIG. 2 comprises a GERAN access network (GPRS-EDGE Radio Access network), designated by the reference 15, used by GSM/GPRS/EDGE systems, a UTRAN access network (Universal Terrestrial Radio Access Network), designated by the reference 25, used by the UMTS system, and an access network BRAN (Broadband Radio Access Network), designated by the reference 35, used by Wireless LAN systems. Moreover, reference 40 in FIG. 2 designates the 3G Core Network.

In FIG. 3, the transport segment of the multi-access network (the 3G Core Network, here too, as in FIG. 2, designated by the reference 40) is interconnected with the GERAN access network 15, through the interface 41, with the UTRAN access network 25, through the interface 42 and with the Wireless LAN 35, through the interface 43.

In FIG. 3, the network device that controls the radio resources of the GSM system (11a), called BSC (Base Station Controller), is designated by the reference 11.

The network device, called RNC (Radio Network Controller), which controls the radio resources of the UMTS system (22a), is instead designated by the reference 22 in FIG. 3, whilst the network device called APC (Access Point Controller), which controls the AP (Access Points) of the Wireless LAN (33a), is designated by the reference 33.

These three network devices, Base Station Controller 11, Radio Network Controller 22, and Access Point Controller 33, can exchange information one each other through the Core Network 40.

Alternatively, if two specific interfaces 21 and 31 are present, the Base Station Controller 11 can communicate directly through the interface 21 with the Radio Network Controller 22, and the Radio Network Controller 22 can communicate directly through the interface 31 with the Access Point Controller 33. In similar fashion, there may be an interface (not specifically shown in the drawings) which allows the Base Station Controller to communicate directly with the Access Point Controller 33.

The CRRM solution described herein can reside and be implemented within the Base Station Controller 11, the Radio Network Controller 22 and the Access Point Controller 33.

Alternatively, the solution can be executed within a network entity called CRRM Server, reference 50 in FIG. 3, which is specifically used for the common management of the radio resources of the multi-access network.

The CRRM Server 50 can request information on the GSM cells from the Base Station Controller 11 through the interface 51, on the UMTS cells from the Radio Network Controller 22 through the interface 52, and on the Wireless LAN hot-spots from the Access Point Controller 33 through the interface 53.

It can be deduced that both the architecture that provides for distributing the common management parts of the radio resources in the individual network controllers (BSC 11, RNC 22 and APC 33), and the architecture of FIG. 3 in which the centralised unit, CRRM Server 50, is present, are suited to support a generic CRRM solution.

In this sense, the solution described herein does not have any additional or different requirement from those already prescribed by the 3GPP standard in its current version and by the subsequent releases, both for the interworking architecture between UTRAN 25, GERAN 15 and Wireless LAN 35, and for the CRRM functional architecture.

Overall, in the described scenario, different types of services can be taken into consideration. Together with the classic voice service, the presence of one or more data services can be hypothesised.

Data services can be, for example, a video-telephone call (conversational class data service), Web surfing (interactive class), the fruition of multimedia contents delivered by a network server (streaming class), access to one's email box (background class), etc.

According to its own specific type, each service can be allocated to one or more access networks which constitute the system.

A voice service can, for example, be provided through the GSM network or the UMTS network, whilst a data service can be provided through the UMTS network or the Wireless LAN network.

The criterion for selecting the best suited system among GSM, UTMTS and Wireless LAN is described below considering, purely by way of example, the presence of two different services: a voice service and a streaming class data service at 128 Kbps in downlink and 16 Kbps in uplink; the voice service can be offered through the G-SM system or the UMTS system, whilst the data service can be offered through the UMTS system or the Wireless LAN system.

The specific Wireless LAN technology considered in the present description is in accordance with the IEEE 802.11b standard.

In the solution described herein, the different combinations of the two services described by the joint "capacity region" are examined.

In general, the capacity region for a single system identifies the different combinations of the number of users which can be supported by the system for each service according to available resources.

Figure 4:
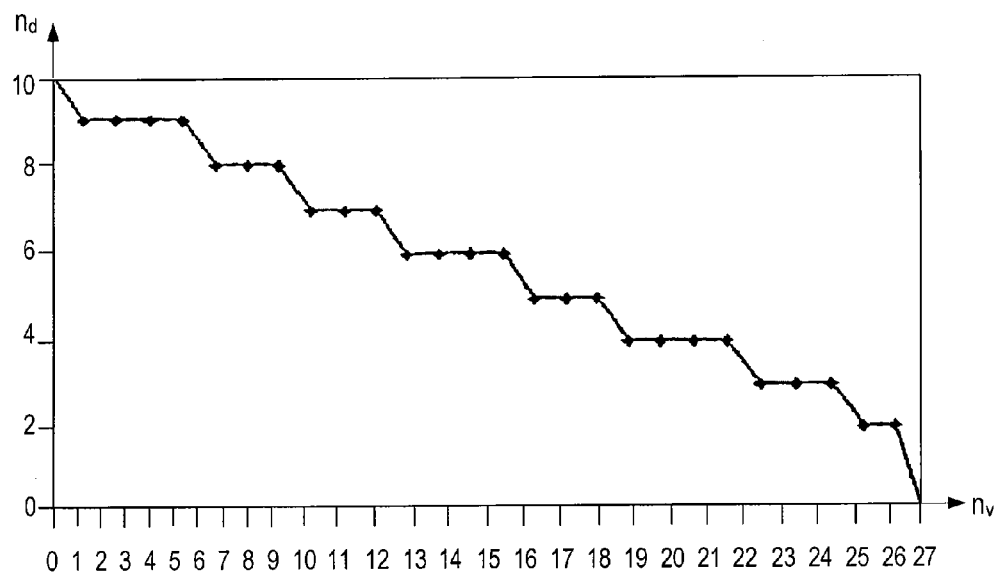
FIG. 4 shows a possible example of capacity region for a cell of the UMTS system, which has to manage two different services, i.e. a voice service and a streaming data service at 16 Kbps in uplink and 128 Kbps in downlink.

A possible example of capacity region for a cell of the UMTS system, which has to manage the two services taken as a reference, is illustrated in FIG. 4. In FIG. 4, the X axis shows the number of voice users ($n_v$) and the Y axis shows the number of data users ($n_d$).

The border of the capacity region is the limit beyond which the system is no longer able to accept additional users; each of its points, therefore, represents the optimal traffic combination, in which the system works at full load.

Vice versa, below this area, the system is underutilised, because it would be possible to allocate other users, based on available radio resources.

Assuming a specific value for one of its quantities, from the curve of the capacity region one can derive the maximum value that the other quantity can assume in order fully to occupy the resources available to the system.

Hence, in the case under consideration, in the presence of 14 voice users ($n_v=14$), from the curve one obtains that the UMTS cell is able to support a maximum of 6 data users ($n_d=6$). With a higher number of voice users, the maximum number of data users that can be managed will instead be lower.

Vice versa, again starting from the curve of FIG. 4, it is derived that, in the presence of 8 users of the data service ($n_d=8$), the maximum number of voice users that can be managed simultaneously to already active data users is equal to 7 ($n_v=7$).

In the case of a multi-access network of the type considered herein by way of example, together with the UMTS system one also has to consider the presence of the other access systems constituted by the GSM and Wireless LAN (WLAN).

The maximum number of users managed by the Wireless LAN access, for a given service, can be determined on the basis of the Wireless LAN technology in use and of the minimum level of quality of service to be offered to users (e.g., setting a minimum limit for the data transfer rate to be offered to each of the users present, or a limit to tolerable transfer delays).

Figure 5:
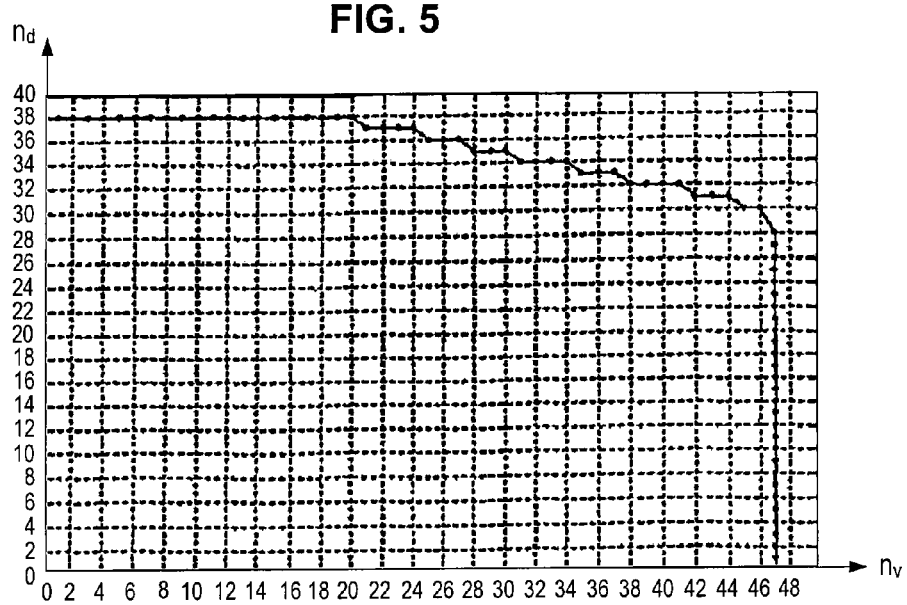
FIG. 5 shows the joint capacity region of a multi-resource (multi-access) network if, in addition to a UMTS cell, a GSM cell able to serve up to 20 voice users and a WLAN access able to serve up to 28 data users are considered.

Assuming that, with the allocated radio resources, the cell of the GSM system is able to manage a maximum of 20 voice users (the data service under consideration is not managed by the GSM system), and that the Wireless LAN hot spot is able to manage up to a maximum of 28 data users (the voice service is not managed by the Wireless LAN system), the corresponding joint "capacity region", shown in FIG. 5, can be determined.

The joint capacity region is able to represent all possible traffic combination of the entire multi-access network under consideration. The curve shown in FIG. 5, therefore, indicates the total number of voice users (on the GSM or on the UMTS) and data users (on the UMTS or on the WLAN) which can be managed by the multi-access network that comprises the three systems mentioned herein.

In the example in FIG. 5, in the presence of 41 voice users ($n_v$=41), from the curve one obtains that the multi-access network is able to manage a maximum of 31 data users ($n_d$=32), through the joint utilisation of the individual access systems.

Globally, the solution described herein provides a different management for voice service requests and data service requests.

Figure 6:
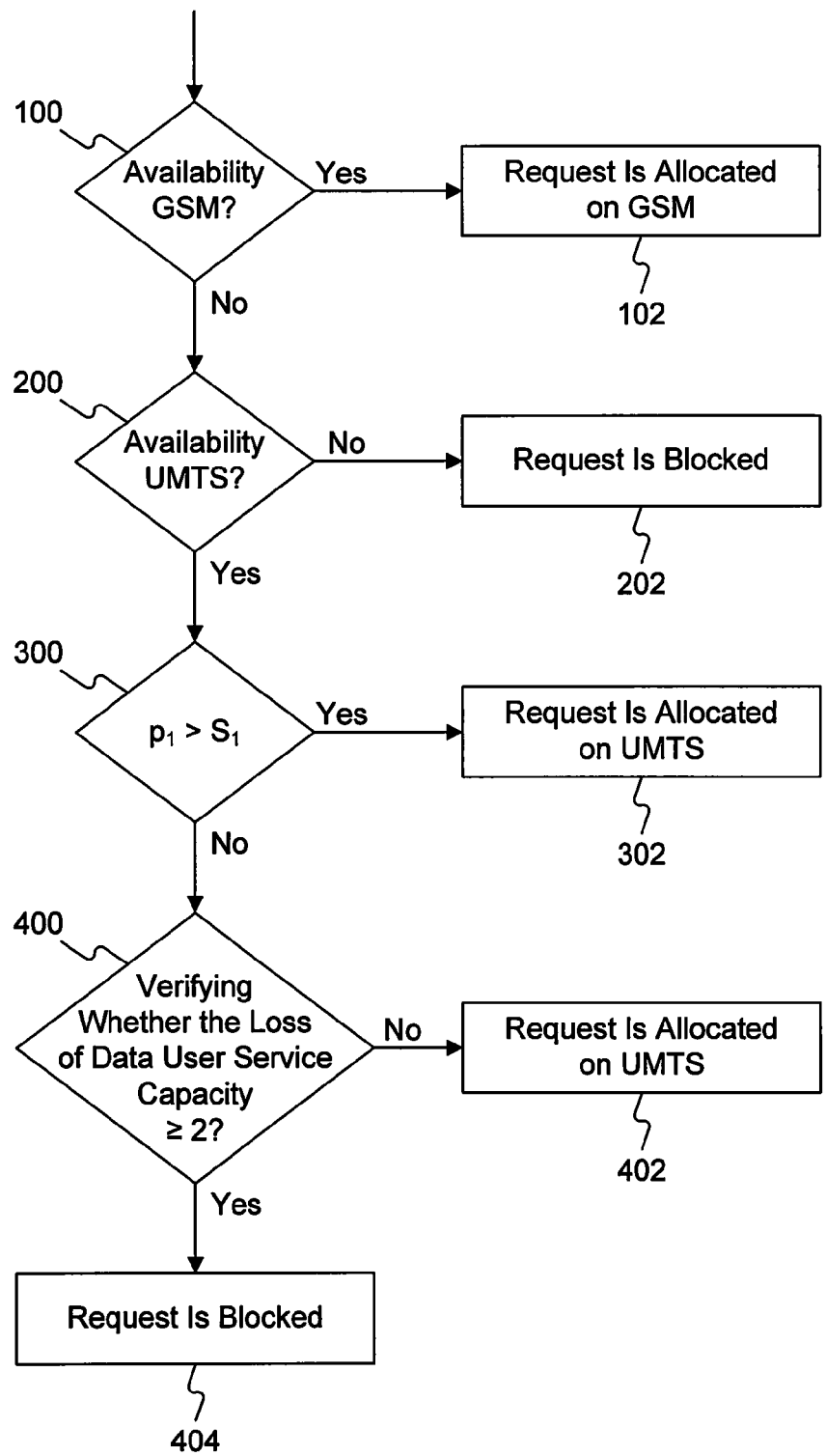
FIGS. 6 and 7 show two flow charts with the solution described herein.
Figure 7:
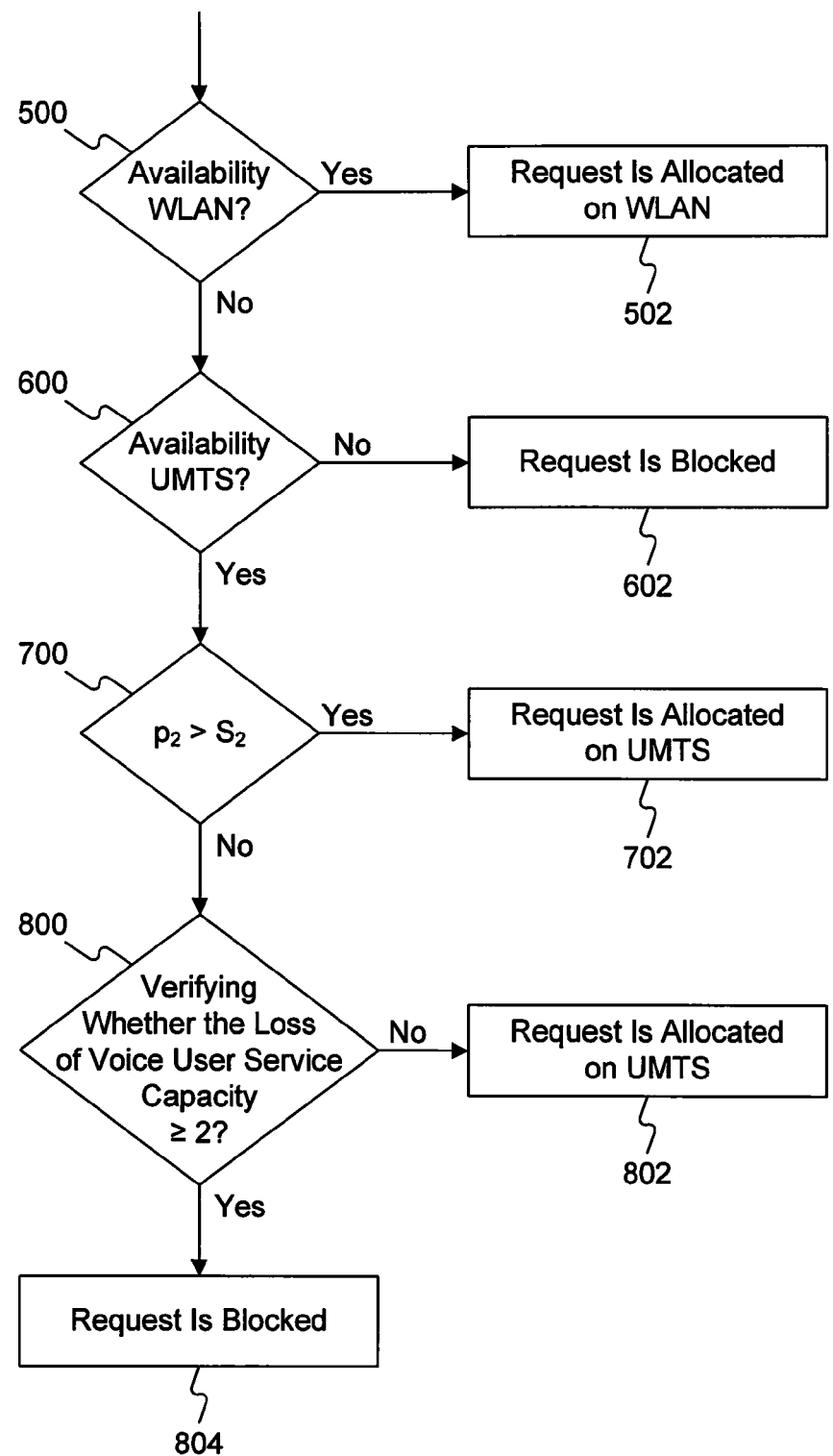

The flow chart of FIG. 6 represents the part relating to the management of voice service requests, whilst the flow chart of FIG. 7 represents the part relating to the management of data service requests.

In regard to the management of requests relating to the voice service (FIG. 6), when a new voice service, request arrives, at first in a conditional step 100 the availability of free resources on the GSM system (which is the preferential system for requests of this kind) is evaluated, in order preferably to allocate voice service requests on this system.

If GSM resources are available, then in the step 102, the new request is allocated on the GSM system.

If all the resources of the GSM system are busy, in a conditional step 200 the availability of free resources on the UMTS system is evaluated.

If all the resources of the UMTS system are already used, the new voice service request is blocked at the step 202.

Instead, in the presence of sufficient free resources in the UMTS system, the method continuous with the steps 300 and 400 of the method that allow an evaluation aimed at estimating whether the choice of allocating the request on said UMTS system is opportune or not.

According to the solution described herein, the simple presence of sufficient free resources in the UMTS system does not necessarily determine the allocation of the voice service request on said system, since doing so could negatively influence the capability of meeting requests for services other than the voice service, which can employ this system (in the situation of the example considered herein, the data service of the streaming class).

To allow the multi-access network to work with an optimal combination of services, the solution described herein contemplates the possibility that it is advantageous to block some voice service requests, in order to leave free resources for the data service.

This takes place through the estimation of the probabilities that the system may receive, in the residual mean time of the services (of any type) already being delivered, a lower number of data service requests than the maximum allowed capacity (including the request for the voice service to be managed among the services being delivered).

The probability of arrival of a lower number of data requests than the maximum capacity of the system, in the time interval $Tr_1$, is defined as "$p_1$".

The mean residual time ($Tr_1$) is the time interval by whose expiration it is reasonable to expect that one or more services (of any type) already being delivered in the multi-access network will be completed, freeing the occupied resources and changing the system load.

Therefore, on average, as long as this time interval has not expired, it can be assumed that none of the ongoing services will end. During this interval, new arriving data service requests would be added to the combination of ongoing services, determining an additional use of resources.

In this condition, the higher is the probability of reaching the maximum level of capacity allowed by the system, the higher is also the probability of having to block any additional requests which should arrive at the network after the maximum manageable capacity has been reached.

To compute the probability "$p_1$" and the mean residual time $Tr_1$, used in the conditional step 300 of FIG. 6 to make the decision of whether or not to accommodate the request, the following expressions, for example, can be used.

$$p_1 = e^{-\lambda_d Tr_1} \sum_{k=0}^{c} \frac{(\lambda_d TR_1)^k}{k!} \quad (1)$$

where the parameters of the equation (1) assume the following meaning;

$\lambda_d$: is the average frequency of arrival of data service requests;

C: is the residual capacity of the system plus one;

$Tr_1$: is the average residual time of the ongoing services.

The residual capacity of the system (plus one) for data users (quantity C, appearing in equation (1)), assumes the following expression:

$$C = C_d(n_v+1) - n_d + 1 \quad (2)$$

where:

$n_d$: is the number of data users simultaneously active in the system;

$n_v$: is the number of voice users simultaneously active in the system;

$C_d(n_v+1)$: is the maximum number of data users which can be managed by the multi-access network in the presence of ($n_v$+1) voice users.

The number of data users which can be managed by the multi-access network if the request in question is accepted, indicated in the equation (2) by the function $C_d(n_v+1)$, is derived through the joint capacity region (FIG. 5), previously described.

The average residual time of the ongoing services ($Tr_1$) which appears in equation (1), if the request is accepted, is given by the following equation:

$$Tr_1 = \frac{1}{\left(\frac{n_d}{T_d} + \frac{n_v+1}{T_v}\right)} \quad (3)$$

where:

$n_d$: is the number of data users simultaneously active in the system;

$n_v$: is the number of voice users simultaneously active in the system;

$T_v$: is the average duration of a voice call;

$T_d$: is the average duration of a data connection.

If the calculated probability "$p_1$" is verified (step 300) to exceed a threshold "$S_1$", provided as an input parameter to the method, then in a step 302 the proposed method allocates the voice service request on the UMTS system.

A high value of "$p_1$" means a high probability of arrival of a lower number of data requests than the number that can be managed, such as to justify the choice of accepting the voice service request being managed.

If the aforesaid condition is instead not verified, then it is possible that such a number of data service requests may arrive as to reach the maximum manageable number. In this condition, the described solution provides, in a conditional step 400, for the evaluation of the loss of data user capacity that would occur if the voice service request is accepted.

The condition of the step 400 of the flow chart of the method shown in FIG. 6 provides for verifying whether the loss of data user service capacity is greater than or equal to a respective loss or decrease threshold, chosen—for example—equal to 2 as shown in the condition (4).

$$C_d(n_v) - C_d(n_v+1) \geq 2 \quad (4)$$

having indicated as:

$C_d(n_v)$: the maximum number of data users which can be managed by the multi-access network in the presence of $n_v$ voice users;

$C_d(n_v,1)$: the maximum number of data users which can be managed by the multi-access network in the presence of $n_v+1$ voice users;

If the condition (4) is verified (step 400), the voice service request is blocked, in a step 404, because of the high loss of capacity by the multi-access network to manage additional data users. On the contrary, if the condition is not verified, then the voice service request is allocated on the UMTS system in a step 402.

Figure 8:
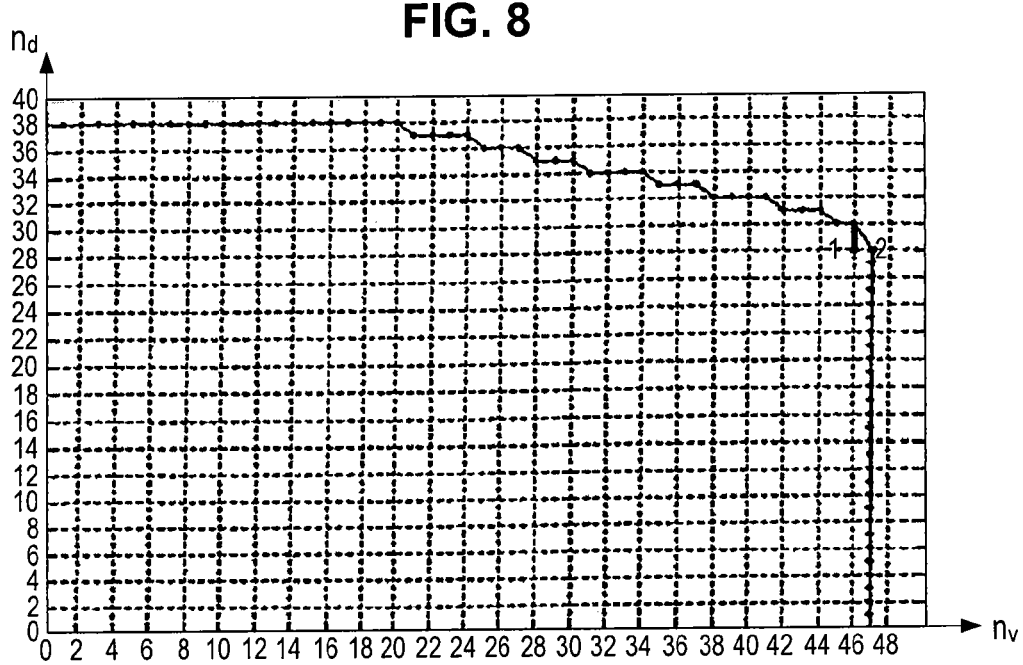
FIGS. 8 and 9 show two examples of use of joint capacity region in FIG. 5.

FIG. 8 shows a representative example of the use of the condition (4).

With reference to FIG. 8, and assuming that the condition is evaluated when the multi-access network has a total load of 46 voice users and 28 data users (point 1 in the figure), when a new voice service request arrives, the load of the system, if the request is accepted, would pass to the point 2 in FIG. 8.

The condition (4) evaluates the variation in the capacity of the data users in the passage between these two points. With 46 voice users (point 1), the residual capacity for data users is equal to 2 users, whilst if the voice call in question is accepted (point 2), the residual capacity for data users would be reduced to 0 units (the point 2 is exactly on the border of the capacity region).

Accepting the voice service request, therefore, would cause a loss of 2 units of capacity for data users. In the case of the examined example, therefore, the capacity loss, being equal to two, would cause the condition (4) to be verified and, consequently, the voice service request would be blocked.

In regard to the management of data service requests, the method of FIG. 7 in a first conditional step 500 checks whether there are sufficient free resources to allocate data services on the Wireless LAN system, and if so, then in a step 502 the data service request is allocated to that system.

Thus, for offering the data service, the WLAN access is preferred, when available. This policy has the advantage of preserving the resources of the UMTS system which must also be employed to offer the voice service.

In the presence of a data service request which can use only the UMTS system, or if the WLAN system lacks the necessary resources, in a conditional step 600 the described solution checks first of all whether there are sufficient free resources to allocate the data service on the alternative system (UMTS).

If not, in a step 602 of the method the request is necessarily blocked.

In the presence of sufficient free resources in the UMTS system, instead, the method continues with the steps 700 and 800 assessing whether it is opportune or not to allocate the request on said system.

According to the described solution, the simple presence of sufficient free resources in the UMTS system does not necessarily determine the allocation of the data service request on said system, since this could compromise the capability of satisfying requests for services other than the data service, which can use this system (in the situation of the examined example, the voice service).

For the multi-access network to be able to work with an optimal combination of the two services, it is possible that, in specific occasions, it is opportune to block some data service requests, to leave free resources for the voice service.

For this reason, the described solution provides for the estimation of the probability that, in the average residual time of the already ongoing services (of any type), a number of voice service requests lower than the maximum allowed capacity may reach the system (including also the request for the data service being managed among ongoing services).

The probability of arrival of a lower number of voice requests than the maximum capacity in the time interval $Tr_2$ is defined "$p_2$".

The mean residual time ($Tr_2$) is the time interval by whose expiration it is reasonable to expect that one or more services (of any type) already being delivered in the multi-access network will be completed, freeing the occupied resources and changing the system load.

Therefore, on average, as long as this time interval has not expired, it can be assumed that none of the ongoing services will end. During this interval, new arriving voice service requests would be added to the combination of ongoing services, determining an additional use of resources.

In this condition, the higher is the probability of reaching the maximum level of capacity allowed by the system, the higher is also the probability of having to block any additional requests which should arrive at the network after the maximum manageable capacity has been reached.

To compute the probability "$p_2$" and the mean residual time $Tr_2$, used in the conditional step 700, the following expressions, for example, can be used:

$$p_2 = e^{-\lambda_v Tr_2} \sum_{k=0}^{c} \frac{(\lambda_v Tr_2)^k}{k!} \quad (5)$$

where the parameters of the equation (5) assume the following meaning:

$\lambda_v$: is the average frequency of arrival of voice service requests;

C: is the residual capacity of the system plus one;

$Tr_2$: is the average residual time of the ongoing services.

The residual capacity of the system (plus one) for voice users (quantity C in equation (5)) assumes the following expression:

$$C = C_v(n_d+1) - n_b + 1 \quad (6)$$

where:

$n_d$: is the number of data users simultaneously active in the system;

$n_v$: is the number of voice users simultaneously active in the system;

$C_v (n_d+1)$: is the maximum number of voice users which can be managed by the multi-access network in the presence of $(n_d+1)$ data users.

The number of voice users which can be managed by the multi-access network if the request in question is accepted, indicated in the equation (6) by the function $C_v(n_d+1)$, is derived through the joint capacity region of FIG. 5, previously described.

The average residual time of the ongoing services ($Tr_2$), which appears in equation (5), if the request is accepted, is given instead by the following expression:

$$Tr_2 = \frac{1}{\left(\frac{n_d+1}{T_d} + \frac{n_v}{T_v}\right)} \quad (7)$$

where:

$n_d$: is the number of data users simultaneously active in the system;

$n_v$: is the number of voice users simultaneously active in the system;

$T_v$: is the average duration of a voice call;

$T_d$: is the average duration of a data connection.

If the calculated probability "$p_2$" is verified (step 700) to exceed a threshold "$S_2$", provided as an input parameter to the method, then in a step 702 the described solution allocates the voice service request on the UMTS system.

A high value of "$p_2$" means a high probability of arrival of a lower number of voice requests than the number that can be managed by the multi-access network, so that it is advantageous to accept the data service request being managed.

If this condition is not verified, then it is probable that such a number of voice service requests may arrive as to reach the maximum manageable number.

In this condition, the described solution provides, in a conditional step 800, for the evaluation of the loss of voice user capacity that would occur if the data service request is accepted. The condition contained in the step 800 of the flow chart of the method of FIG. 7 provides for verifying whether the loss of voice user service capacity is greater than or equal to a respective decrease threshold, chosen here too—for example—equal to 2 as shown in the condition (8), $$C_v(n_d) - C_v(n_d+1) \geq 2 \quad (8)$$

having indicated as:

$C_v(n_d)$: the maximum number of voice users which can be managed by the multi-access network in the presence of $n_d$ voice users;

$C_v (n_d+1)$: is the maximum number of voice users which can be managed by the multi-access network in the presence of $(n_d+1)$ data users.

If the condition (8) is verified (step 800), the data service request is blocked, in a step 804, because of the high loss of capacity by the multi-access network to manage additional voice users.

On the contrary, if the condition (8) is not verified, then the data service request is allocated on the UMTS system in a step 802.

Figure 9:
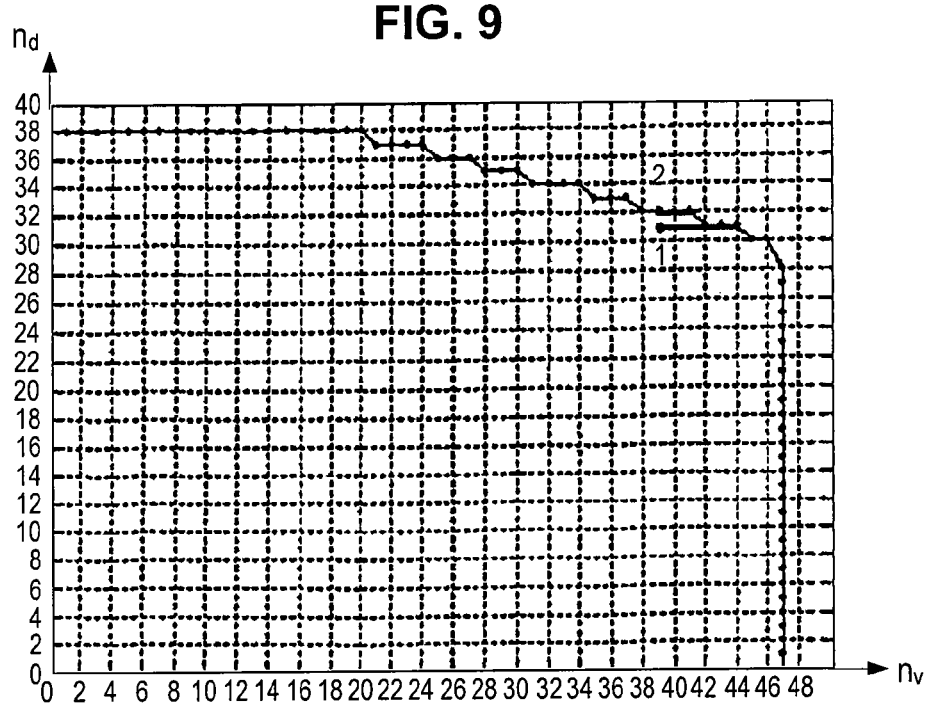

FIG. 9 shows a representative example of use of the condition (8).

With reference to FIG. 9, and assuming that the condition is evaluated when the multi-access network has a total load of 39 voice users and 31 data users (point 1 in the figure), when a new data service request arrives, the load of the system, if the request is accepted, would pass to the point 2 in the figure.

The condition (8) evaluates the variation in the capacity of the voice users in the passage between these two points. With 31 voice users (point 1), the residual capacity for voice users is equal to 5 users, whilst if the voice call in question is accepted (point 2), the residual capacity for voice users would be reduced to 2 units.

Accepting the data service request, therefore, would cause a loss of 3 units of capacity for voice users. In the case of the examined example, therefore, the capacity loss, being greater than two, would cause the condition (8) to be verified and, consequently, the data service request would be blocked.

The procedures described above are applied, respectively upon the arrival of a service request of one or of the other type (typically voice and data).

When a voice service request arrives, before accepting the verification is made whether the acceptance would be such as to determine a loss of data management capacity, whilst when a data request arrives, before accepting it, the verification is made whether this would be such as determine a loss of voice management capacity.

Overall, the final result is that, when the maximum limit of use of the resources is approached, only the type of service requests that "costs" least is accepted (or the one that causes the smallest reduction in service capacity).

In this regard, it will also be appreciated that the two expressions (1) and (5) introduced previously can be merged in a single expression of the type $$p_x = e^{-\lambda_y Tr_x} \sum_{k=0}^{c} \frac{(\lambda_y Tr_x)^k}{k!} \quad (1)$$

where the parameters of the equation (1) assume the hollowing meaning:

$p_x$ (x=1 or, respectively, 2): is said probability, $\lambda_y$; (y=2 or, respectively, 1) is the average frequency of arrival of the service requests of said at least one second type (i.e. of alternative service with respect to the service—of the first type) being managed;

C: is the residual capacity of the system plus one;

$Tr_x$: is the average residual time of the ongoing services (of any type).

A concrete example of operation of the described solution, implemented choosing to use a value of the thresholds $S_1$ and $S_2$ equal to 0.9 is provided below.

The average duration of voice calls is assumed to be 120 seconds and the average duration of the streaming session is assumed to be 200 seconds ($T_v$=120 and $T_D$=200). It is also assumed that the average frequency of arrival of voice service requests ($\lambda_v$) is 0.32 seconds$^{-1}$ whilst the average frequency of arrival of data requests ($\lambda_d$) is 0.16 seconds$^{-1}$ (these values correspond to a global voice traffic of about 38 Erlang in the multi-access system and a data system of 32 simultaneously active connections, assuming no block).

At a given instant, the total load network is assumed to be 41 voice users and 31 data users. The 41 voice users are subdivided into 20 voice users on the GSM cell (all of whose resources are busy) and 21 voice users on the UMTS cell (which still has free resources available). The 31 data users are subdivided into 28 data users on the Wireless LAN hot spot (whose resources allow to allocate additional users without maintaining the minimum level of quality associated to the user) and 3 data users on the UMTS cell.

If a voice service request reaches the network, the solution described herein, based on the method of FIG. 6, verifies the availability of the GSM system (step 100).

Since all the resources of the GSM system are busy, the availability of sufficient free resources in the UMTS system is verified (step 200).

Since the UMTS still has free resources available, the condition of step 300 is evaluated, i.e. whether "$p_1$" is greater than $S_1$. Given the loading state of the system, the value of "$p_1$." according to the equation (1) is equal to 0.9593. Since the value of "$p_1$" exceeds 0.9 (threshold $S_1$), the voice call is allocated on the UMTS system.

If a data service request reaches the network, the solution described herein, based on the method of FIG. 7, verifies whether the WLAN hot spot can be used to offer the requested service. Since the resources of the WLAN system are at such a level of use as not to allow allocating additional users without maintaining the minimum level of quality associated to the service, the evaluation is made whether the UMTS system has sufficient free resources to allocate the service (step 600).

Considering 21 voice users, the maximum number of data users which can be allocated on the UMTS system is, in the particular example considered herein, equal to 4 (as derived from the capacity region of the UMTS cell, of FIG. 4, taken as reference). Since the presence of only 3 data users on the UMTS cell has been assumed, the data service request can be allocated in the UMTS cell. The subsequent operation consists of verifying in the step 700 whether "$p_2$" exceeds the threshold $S_2$.

Given the loading state of the system, the value of "$p_2$" according to the equation (5) is equal to 0.8691. Since the value of "$p_2$" is lower than 0.9 (threshold $S_2$), the condition of the step 700 is not verified and the condition of the step 800, indicated by the condition (8), is consequently evaluated.

Since with 41 voice users, in the passage from 31 data users to 32 data users, there would be a loss of voice users capacity of 3 units (based on the joint capacity region of FIG. 5, used as an example) the condition is found to be true and this causes the request to be blocked.

To described the solution presented herein, the presence of the voice service and of a specific data service (Streaming class at 128 Kbps in downlink and 16 Kbps in uplink), was assumed for a total of only two types of service.

It will be readily apparent to those versed in the art that the solution described herein can be extended also to the case of more than two services.

In the presence of a number of services equal to S, for example, it is still possible to determine a capacity region able to represent all possible combinations of users of each service supported by the multi-access network. Defining as $n_i$ the number of users that employ the i-th service and given a certain number of access systems that constitute the network, those versed in the art are able to derive, for each possible case, the link that characterises the quantities $n_i$, completely defining the joint capacity region of the multi-access network, as a function of the type of individual services considered and of the radio resources with which the different access systems are dimensioned.

To describe the proposed method, it was also chosen to refer to the voice service and to a data service of the streaming class at 128 Kbps in downlink and 16 Kbps in uplink.

The solution described herein can be applied more in general if other types of service need to be considered. Similarly to what is described herein, according to the specific services considered (and their characteristics in terms of quality profile to be guaranteed) it is possible to determine the optimal combinations the multi-access network is able to manage, which can be represented through the joint capacity region.

For illustration simplicity reason, it has been implicitly assumed herein that the joint capacity region associated to the multi-access network and to the considered services can be determined a priori, based on the characteristics of the individual access systems.

However, this assumption is not imperative in itself. The principles at the base of the solution described herein remain valid also in the hypothesis that it is necessary or simply more convenient to determine the joint capacity region at the time when a specific service request is to be managed.

The joint capacity region is used to compute "$p_1$" and "$p_2$" (expressions of the parameter C of the equations (2) and (6)) or when it is necessary to quantify (through the conditions (4) and (8) the loss of capacity of the multi-access of the network if a service request is accepted (step 400 in the flow chart of FIG. 6 and step 700 of the flow chart of FIG. 7).

in these situations, the estimates of the maximum number of users that can be supported or the evaluation of the loss of capacity can be made with alternative methods, for instance based on the specific state of the individual systems of the multi-access network, instead of on system capacity evaluations made a priori.

In the case of a cell of the UMTS system, for example, the maximum number of users that can be supported depends on the instantaneous interference level. Instead of considering the average level of interference generated by a certain of number of users active in the system, it is possible to consider the real level of interference measured by the system (which is a function of the position of the users in the territory and of whether the users are transmitting or not). Using this solution, in practice, a joint capacity region is used which, instead of being determined a priori, is identified from time to time also on the basis of the instantaneous conditions of the individual systems.

Similarly, the expressions used, by way of example, to compute the parameters "$p_1$" and "$p_2$" in the two conditions corresponding to the steps 300 and 700 of the flow charts of FIG. 6 and FIG. 7 can be replaced with equivalent alternative expressions.

In general terms, therefore, different expressions can be used, aimed at estimating, in more or less approximate fashion, the probability that the multi-access network may reach the limit condition as a result of the arrival of new service requests.

In the same way, instead of the quantities "$p_1$" and "$p_2$", the use can be hypothesised of different parameters (in terms of number and semantics) aimed at evaluating, the probability that the requests for a given service may cause the multi-access network to reach its limit capacity.

As an example of practical application of the proposed method, a scenario was taken in which the GSM system, the UMTS system and a WLAN system are used as a single integrated mobile radio network.

More in general, the solution described herein is applied (with the same basic procedures) in the presence of access networks characterised by different standards (regardless of the specific standards considered), and used as a single system.

The principles on which the proposed criterion is based do not specifically refer to any of the standards taken as references (GSM, UMTS or WLAN).

In particular, the different combinations of services which the multi-access network is able to manage, represented by the joint capacity region, can be identified (in a manner known to those versed in the art) according to the characteristics of the standards that regulate the access systems considered.

Another practical application of the proposed allocation methods pertains to the case of a single access system, in which two or more hierarchically different cellular layers are present (within a mobile radio network, hierarchy cell structures are identified by the acronym "HCS"). A single system in which, however, at least two different layers are present (for example MACRO cells and MICRO cells) can be considered for all intents and purposes as a "heterogeneous" system, because there is the problem of jointly managing the radio resources of the cells belonging to the two layers. Said cells, for their characteristics, are characterised by different (superposed) coverage areas and quantities of radio resources.

Therefore, in these cases too it is possible to use the proposed methods to identify which layer is better suited to be used to offer the requested service, replacing the concept of heterogeneous network on the basis of the different Radio Access Technologies (RAT) used, with that of heterogeneous concept based on the different hierarchical cell layers used.

The solution described herein at high level through the flow charts of FIG. 6 and FIG. 7 can be advantageously implemented in different mutually equivalent forms, e.g. using a different number of internal variables or using a different flow of instructions and comparisons, without thereby modifying the basic logic of the criteria described herein.

In the description provided herein, simply for the sake of convenience, it was implicitly assumed that the requests for activating a given service are always originated by the users ("UE originated" request).

It is also possible for the network to reach the user offering a given service ("UE terminated" request), without any type of consequences on the procedures for managing the selection of which system can be most advantageously used.

Naturally, without altering the principle of the invention, the construction details and the embodiments may be varied, even to a significant extent, relative to what is described and illustrated purely by way of non limiting example herein, without thereby departing from the scope of the present invention as defined in the claims that follow.

The invention claimed is:

1. A method for controlling, in a multi-resource communication network comprising a plurality of resources corresponding to communication systems according to different communication standards, the delivery of services by at least one first resource of the plurality of resources, in which said at least one first resource is capable of simultaneously delivering, within a maximum joint service capacity, at least one first and one second type of service to a first set of users and a second set of users, respectively; the increase in a quantity of users in said first set of users leading to a decrease in the capacity to serve new users of said at least one second type of service, comprising, in the presence of a service request of said first type, the steps of:

defining said maximum joint service capacity based on the number of users of each service as a function of the resources, wherein the resources can, within said multi-resource network, simultaneously deliver at least said first type of service and said second type of service;

verifying the capability of satisfying said request of said first type of service by a second resource of the plurality of resources of said multi-resource network, wherein the second resource corresponds to a communication system according to a different standard than said at least one first resource, and wherein the second resource is preferentially usable with respect to said at least one first resource, if said capability exists, satisfying said service request of said first type through said second resource;

estimating at least one parameter representing the probability that, within a given time interval, the number of service requests of said at least one second type is such as not to cause said maximum joint service capacity to be reached;

comparing said at least one parameter with at least one respective threshold value; and if said at least one parameter is greater than said respective threshold value, accepting said service request of said first type.

2. The method as claimed in claim 1, wherein, if said at least one parameter is lower than or equal to said respective threshold value comprising the steps of:

evaluating a possible decrease in the capacity to serve new users of said at least one second type of service able to be induced by the acceptance of said request for said first type of service;

comparing said possible decrease with a respective value of decrease threshold; and i) accepting said service request of the first type if said possible decrease is smaller than said value of decrease threshold, and ii) blocking said service request of said first type if said possible decrease is greater than or equal to said value of decrease threshold.

3. The method as claimed in claim 1, comprising the step of verifying the capability of satisfying said request of said first type of service by said at least first one resource and, in the absence of said capability, the step of blocking said service request of first type.

4. The method as claimed in claim 1, wherein said at least one parameter coincides with the value of said probability.

5. The method as claimed in claim 1, comprising the step of identifying said given time interval as the average residual time of all services delivered at that time by said multi-resource network.

6. The method as claimed in claim 1, comprising the step of computing said probability with an expression of the following type:

$$p_x = e^{-\lambda_y Tr_x} \sum_{k=0}^{c} \frac{\lambda_y Tr_x{}^k}{k!} \quad (1)$$

wherein the parameters of the equation (1) assume the following meaning:

$p_x$: (x=1 or, respectively, 2) is said probability;

$\lambda_y$: (y=2 or, respectively, 1) is the average frequency of arrival of the service requests of said at least one second type;

C: is the residual capacity of the system plus one; and $Tr_x$: is the average residual time of all services delivered at that time by said network.

7. The method as claimed in claim 1, wherein that said multi-resource network comprises a plurality of resources comprising different layers of a same communication standard.

8. A system for controlling, in a multi-resource communication network comprising a plurality of resources corresponding to communication systems according to different communication standards, the delivery of services by at least one first resource of the plurality of resources, in which said at least one first resource is capable of simultaneously delivering, within a maximum joint service capacity, at least a first and a second type of service to a first set of users and a second set of users, respectively, the increase in a quantity of users in said first set of users leading to a decrease in the capacity to serve new users of said at least one second type of service, comprising at least one estimation module configured to:

define said maximum joint service capacity based on the number of users of each service as a function of the resources, wherein the resource can, within said multi-resource network, simultaneously deliver at least said first type of service and said second type of service;

verify the capability of satisfying said request of said first type of service by a second resource of the plurality of resources of said multi-resource network, wherein the second resource corresponds to a communication system according to a different standard than said at least one first resource, and wherein the second resource is preferentially usable with respect to said at least one resource, wherein, if said capability exists, satisfy said service request of said first type through said second resource;

estimate at least one parameter representing the probability that, in a given time interval, the number of service requests of said at least one second type is such as not to cause said maximum joint service capacity to be reached;

compare in the presence of a service request of said first type, said at least one parameter with at least one respective threshold value; and indicate the acceptability of said service request of said first type if said at least one parameter exceeds said respective threshold value.

9. The system as claimed in claim 8, wherein said at least one estimation module is configured to perform, if said at least one parameter is lower than or equal to said respective threshold value, the steps of:

evaluating a possible decrease in said capacity to serve new users of said at least one second type of service able to be induced by the acceptance of the request for said first type of service;

comparing said possible decrease with a respective value of decrease threshold; and i) indicating the acceptability of said service request of said first type if said possible decrease is smaller than said value of decrease threshold; and ii) blocking said service request of said first type if said possible decrease is greater than said value of decrease threshold.

10. The system as claimed in claim 8, configured to perform the operation of verifying the capability of satisfying said request of said first type of service through said at least one first resource and, in the absence of said capability, the step of blocking said service request of first type.

11. The system as claimed in claim 8, wherein said at least one parameter coincides with the value of said probability.

12. The system as claimed in claim 8, wherein said at least one estimation module is configured to identify said given time interval as the average residual time of all services delivered at that time by said multi-resource network.

13. The system as claimed in claim 8, wherein said at least one estimation module is configured to compute said probability with an expression of the following type:

$$p_x = e^{-\lambda_y Tr_x} \sum_{k=0}^{c} \frac{(\lambda_y Tr_x)^k}{k!} \quad (1)$$

where the parameters of the equation (1) assume the following meaning:

$p_x$: (x=1 or, respectively, 2) is said probability;

$\lambda_y$: (y=2 or, respectively, 1) is the average frequency of arrival of the service requests of a type other than said first type of service;

C: is the residual capacity of the system plus one; and $Tr_x$: is the average residual time of all services delivered at that time by said network.

14. A multi-resource communication network incorporating a system as claimed in claim 13.

15. The network as claimed in claim 14, wherein said multi-resource network comprises a plurality of resources comprising different layers of a same communication standard.

16. A computer readable medium encoded with a computer program product loadable into a memory of at least one electronic computer, the computer program product comprising portions of software code for implementing the method as claimed in claim 1.

* * * * *